（12）United States Patent  
Hilde

(10) Patent No.: US 7,616,817 B2
(45) Date of Patent: Nov. 10, 2009

(54) THREE DIMENSIONAL SHAPE CORRELATOR

(75) Inventor: Jeffrey J. Hilde, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 172 days.

(21) Appl. No.: 11/926,252

(22) Filed: Oct. 29, 2007

(65) Prior Publication Data

US 2008/0273210 A1   Nov. 6, 2008

Related U.S. Application Data

(63) Continuation-in-part of application No. 11/787,343, filed on Apr. 12, 2007, now abandoned.

(51) Int. Cl.
*G06K 9/00*   (2006.01)
(52) U.S. Cl. ......................... 382/181; 382/106; 382/154
(58) Field of Classification Search ................. 356/4.01
See application file for complete search history.

(56) References Cited

U.S. PATENT DOCUMENTS

2002/0174406 A1* 11/2002 Matsuzaki et al. ............. 716/4

* cited by examiner

*Primary Examiner*—Thomas H Tarcza
*Assistant Examiner*—Timothy A Brainard
(74) *Attorney, Agent, or Firm*—David S. Kalmbaugh

(57) ABSTRACT

A three dimensional shape correlation computer software program which uses laser radar data for target identification. The correlation program obtains a scan of laser radar data of a target from a Ladar sensor. The data includes a plurality of X,Y,Z coordinate detection points for the target. The software simulates the sensor scan using a 3D wire-frame model of the target. An X,Y,Z coordinate location is computed for every point in the computer model of the target. The software compares the X,Y,Z coordinate detection points for the target with the X,Y,Z coordinate points for the computer model to determine if the points match. When there is a match a target identification is declared.

11 Claims, 8 Drawing Sheets

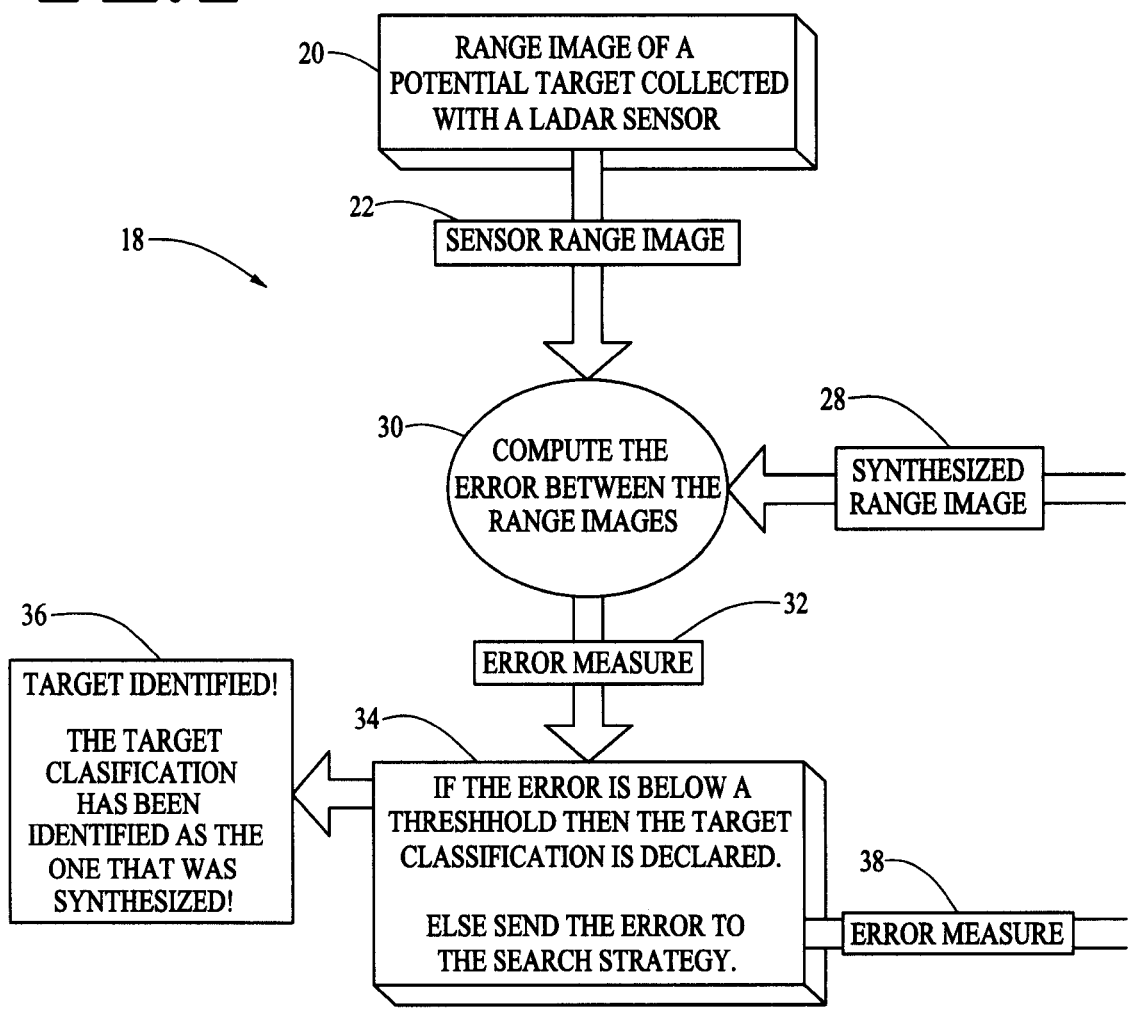

| Fig. 5A | Fig. 5B |

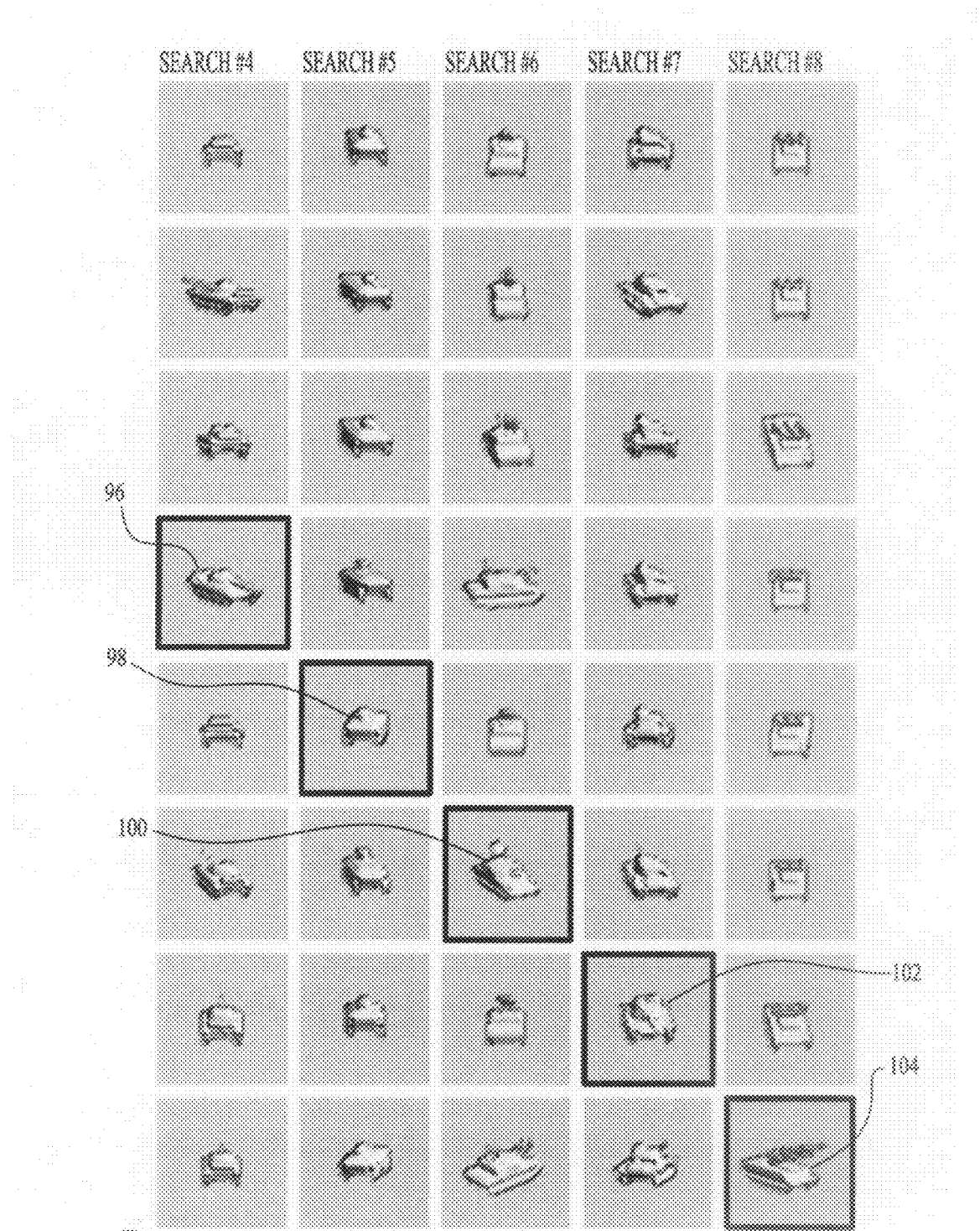

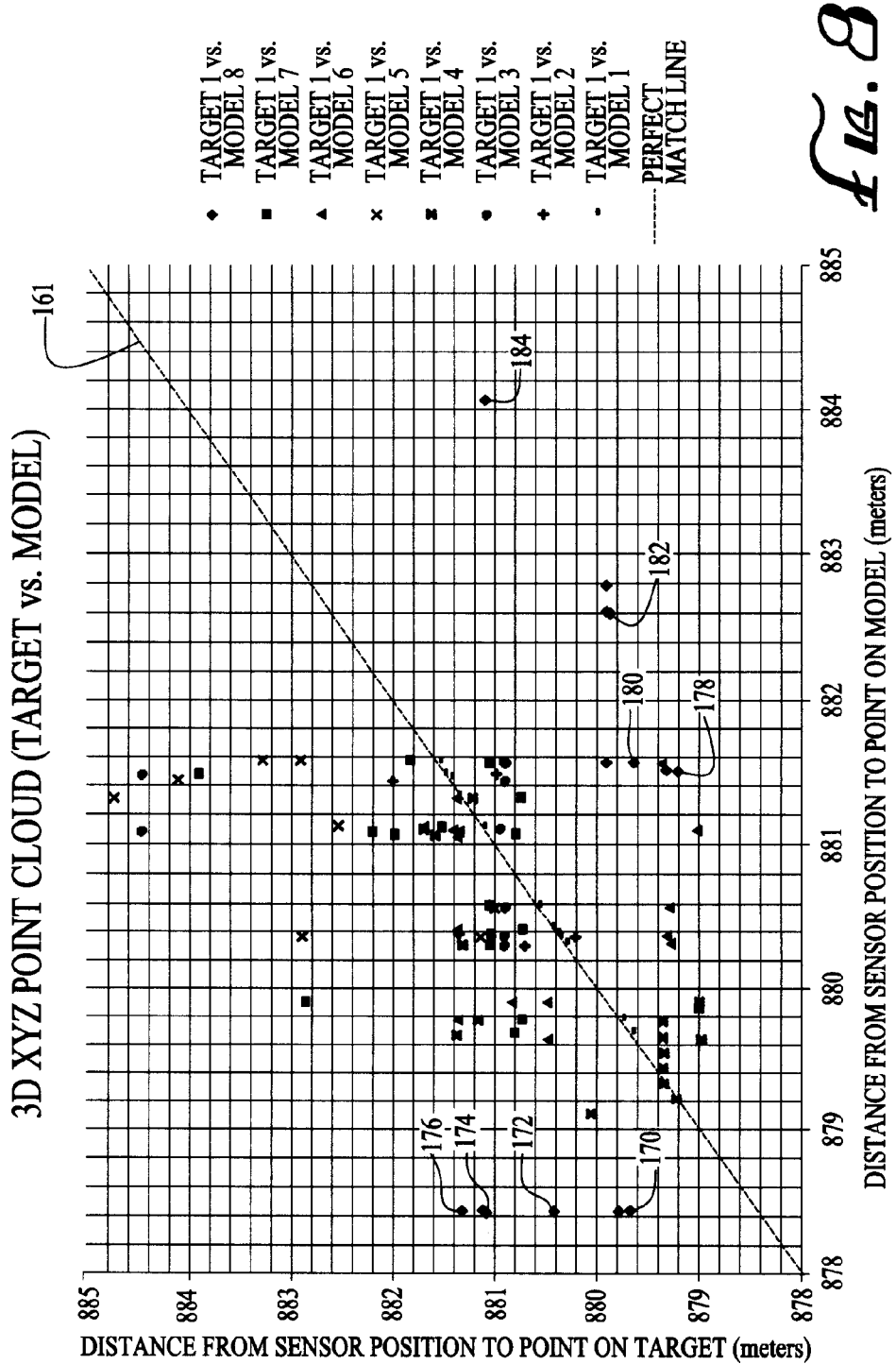

THREE DIMENSIONAL SHAPE CORRELATOR

The application is a continuation-in-part of U.S. patent application Ser. No. 11/787,343, filed Apr. 12, 2007 now abandoned.

BACKGROUND OF THE INVENTION

1. Field of the Invention

The present invention relates generally to target recognition. More particularly, the present invention relates to an automatic target recognition (ATR) computer software program which uses Laser Radar (Ladar) data and three dimensional image data for target identification.

2. Description of the Prior Art

There is currently a need by the military for fast and accurate real time target recognition especially in a battle field environment. There are several benefits to having instantaneous and accurate target recognition including the prevention of serious harm or loss of life to troops in a hostile environment.

In the past target recognition devices have utilized maximum average correlation height (MACH) filtering techniques. These target recognition devices generally operate in a two dimensional space resulting in target recognition which is sometimes inaccurate and also not timely in providing needed target recognition data.

Three dimensional data for an object is reduced to two dimensional computer graphics for processing by a computer to determine the characteristics of a target or weapons system. Once these two dimensional characteristics are determined a comparison is made with information in a data base to identify the target. The fact that only two dimensional data is used will often lead to an erroneous result which can be very costly especially to military personnel in a combat environment who depend on accurate results to formulate their battle plans and defenses against these targets or weapons systems.

To improve results, it is very important that the target recognition device operate in a three dimensional image space to make use of all relevant data and allow a user to accurately determine the identity of a target or weapons system. The target recognition process needs to operate on three dimensional surfaces and process the data in three dimensions. Ladar data operates in three dimensional space and thus is very useful for target recognition processing.

SUMMARY OF THE INVENTION

The present invention overcomes some of the difficulties of the past including those mentioned above in that it comprises a highly effective computer software program which processes three dimensional laser radar or Ladar data for fast, accurate and efficient target recognition.

A range image of a potential target is collected using a Ladar Sensor. To improve results the method or process comprising the invention operates on three dimensional (3D) physical measurements of points on the surface of a target or weapons system, which is the kind of data generated by a Ladar sensor. The method or process relies on the actual three dimensional shape of a target by measuring actual points on the target's surface. These three dimension points of a target are referred to as a cloud of points of the target in three dimensional space. Each point has a physical location that can be measured and recorded as a vector location in a three dimensional coordinate system, that is an X,Y,Z point in the coordinate system. A Ladar sensor generates a distance measurement of the distance between the Ladar sensor and each point on the targets surface.

A triangle computer model of the target is generated and a computer model of the Ladar sensor is used to synthesize the X,Y,Z points on the computer model of the target. An X,Y,Z coordinate location is computed for every point in the computer model of the target. The computer model of the target is rotated and translated until the X,Y,Z coordinate points in the computer model of the target as measured by the model of the Ladar sensor are the same as the X,Y,Z coordinate points for the target as measured by the LADAR sensor. Distances measured from the Ladar sensor to the X,Y,Z coordinate points on the target are compared with computer generated distances as synthesized by the model of the Ladar sensor. The distance measurements are compared until the distances match.

When the X,Y,Z coordinate locations and distances match, then the geometry of the target and computer model match which results in an object match and a positive target identification.

First the scan of Ladar data is obtained from the Ladar sensor. The scan of Ladar data is MACH filtered to find the X,Y,Z detection points for the target in the data. The Ladar sensor scan is also simulated in the computer software using a 3D wire-frame model of the target. An error is calculated between the actual sensor scan range and the simulated sensor scan range. An RMS error is computed in accordance with the following expression:

$$\text{RMS} = \sqrt{\frac{1}{\text{Width} \cdot \text{Height}} \sum_{i,j} (SensorRange_{ij} - SyntheticRange_{ij})^2} \qquad (1)$$

When the computed error between the target's X,Y,Z points and the computer generated model's X,Y,Z points is sufficiently low the target is a match and recognition and identification of the target is declared.

BRIEF DESCRIPTION OF THE DRAWINGS

FIG. 8 illustrates a plot of the three dimensional X, Y, Z points for the target versus three dimensional X, Y and Z points for the computer generated model.

DETAILED DESCRIPTION OF A PREFERRED EMBODIMENT

Figure 1B:
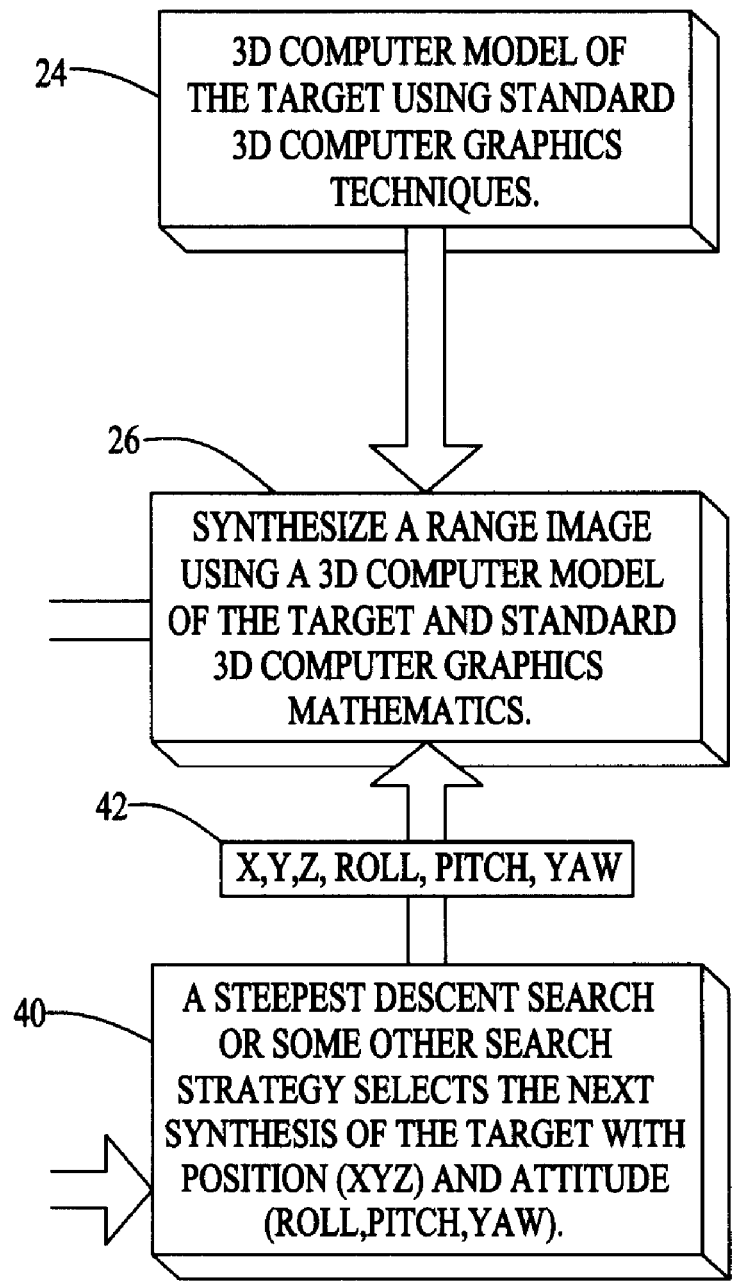
FIG. 1 illustrates a flow chart for the computer program which functions as a three dimensional shape correlator for use in target recognition.

Referring to FIG. 1, a scan of Ladar data is obtained from a Ladar sensor on board an aircraft or another military vehicle. The range image of a potential target, such as a tank or military vehicle is collected from the Ladar data provided by the Ladar source (program step 20 of flow chart 18).

At this time it should be noted that LADAR (laser detection and ranging) is an optical remote sensing technology which measures scattered light to find range and/or other information about a distant target. Normally Ladar uses laser pulses to determine distance to an object or surface. Like the similar radar technology, the range to an object is determined by measuring the time delay between transmission of a pulse and detection of the reflected signal.

Next, the Sensor range image of a potential target is MACH filtered to find detection points for the target in the Ladar data (program step 22). MACH filters also referred to as maximum height correlation filters are correlation filters which recognize distorted views of an object in clutter. The primary purpose of a MACH filter is to detect a target and report its location. MACH filters establish which points in an output plane are caused by background and which are in response to targets. Generally, the vast majority of points are due to background and clutter. Only that point which represents a complete overlap between the target and the filter is minimally influenced by the neighboring background. The number of such points is very small since the expected number of targets is very few compared to clutter area which determines the size of the image and the number of points in the correlation plane.

The sensor scan of a target is also simulated in a three dimensional shape correlation program using a three dimensional wire-frame model of the target (program step 24). Three-dimensional computer generated images are very useful in creating spatial/visual representations of complex mathematical relationships. With the use of three-dimensional imaging techniques, there is an ability for the user to view various aspects of an object, such as a potential target, at a relatively low cost. These three-dimensional images are usually rotated about any one or a combination of the traditional x, y and z orthogonal axis. This, in turn, allows for various views of the object, such as the underside of object which is not shown in an original view. Using computer generated three-dimensional objects also allows for spontaneous, real time target recognition and identification.

The three dimensional shape correlation software synthesized range image (program steps 26 and 28) and sensor range image (program steps 20 and 22) are provided to an error calculation program step which has the reference numeral 30. Program step 30 calculates the error is calculated between the actual sensor scan range and the simulated sensor scan range. An RMS error is calculated in accordance with the following expression:

$$\text{RMS} = \sqrt{\frac{1}{n}\sum_{i=1}^{n}(ActualPixelRange_i - SimulatedPixelRange_i)^2} \quad (2)$$

The software conducts a search in six degrees of freedom of the simulated target. The six degrees of freedom searched are roll, pitch and yaw changes for rotations of the simulated target and vertical, horizontal and range changes for translations of the simulated target. The error between the range images is calculated in the search process (program step 30).

Program step 32 provides the computed error to a decision block. The decision block (program step 34) determines if a sufficiently low error is below a threshold to declare the target a match. When the error is below the threshold, recognition and identification of the target is declared (program step 36). When the error is above the threshold, program step 38 of the software transfers the measured error to a processing block (program step 40). Program step 40 performs a steepest descent search which selects the next synthesis of the target. This synthesis generates range image information for the target including position information (X, Y and Z coordinates) and attitude information (pitch, roll and yaw). The X, Y ad Z positional coordinates and pitch, roll and yaw for the target are provided via program step 42 to program step 26. Program step 26 uses the new position and attitude information to synthesize a second range image for the target. This process continues until the error is below the threshold (program step 34 and the target is identified.

Results on synthetic Ladar data with 1 meter standard deviation range noise have shown that the roll, pitch and yaw can be measured to less than 0.5 degrees and the position error to less than 20 centimeters.

Figure 2:
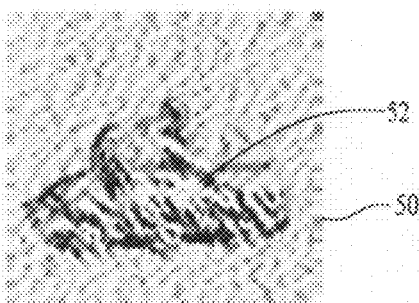
FIG. 2 depicts a real Ladar image of a target which is a military vehicle.

Referring to FIGS. 1 and 2, the method/computer program comprising the present invention takes a real Ladar range image (as shown in FIG. 1) of an object/real image 52 which has been detected and now requires identification. The Ladar range image is made up of pixels where the pixel value is the distance from the Ladar sensor to the objects in the image. A Sensor Range [i,j] is created for an array of range pixels where i is the row index and j is the column index and each element of the array is the distance from the Ladar sensor to the surface of the scene 50 that has been scanned by the Ladar sensor. Width and Height are the dimensions for the array of range pixels that correspond to the width and height of the real image 52.

Figure 3A:
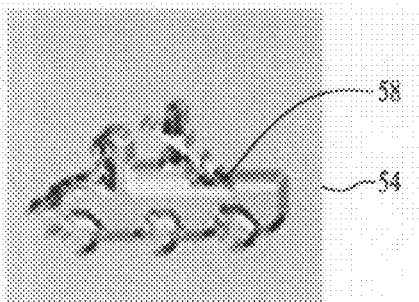
FIG. 3 depicts a pair of synthesized Ladar images of military vehicles.
Figure 3B:
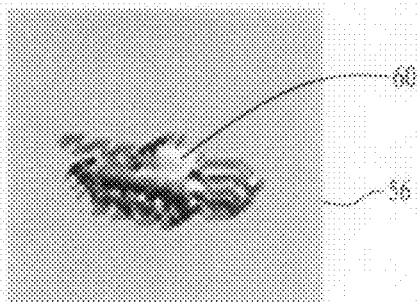

Referring to FIGS. 1, 2 and 3, the three dimensional shape correlation program generates synthesize Ladar images 58 and 60 using 3D wire-frame models of objects that are potential matches with the object 52 in the Ladar image of FIG. 1. A Synthetic Range [i,j] is created for an array of range pixels where i is the row index and j is the column index and each element of the array is the distance from the synthetic Ladar sensor to the surface of the scene 54 and 56 that has been simulated. The dimensions of the array that correspond to the width and height of the synthetic Ladar images 58 and 60 can be the same as in the real Ladar image 52. The simulated scene should be at the same position as the real Ladar image is during the first step of the correlation program.

The correlation program next computes an error between the real Ladar image 52 and the synthetic images 58 and 60 using the following expression:

$$\text{RMS} = \sqrt{\frac{1}{Width \cdot Height}\sum_{i,j}(SensorRange_{ij} - SyntheticRange_{ij})^2} \quad (3)$$

The three dimensional shape correlation program adjust the x, y and z positions for the 3D wire frame models 58 and 60 and the roll, pitch and yaw rotations of the 3D wire-frame models 58 and 60 according to a set search strategy and recompute the error until the search is completed having found a minimum acceptable error.

Figure 4A:
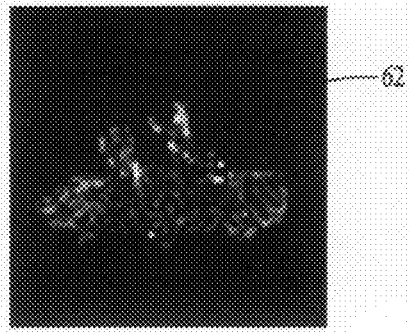
FIG. 4 depicts a pair of error images which are generated after a search for the x, y and z positions and the roll, pitch and rotations of 3D wire-frame models produce a minimum acceptable error.
Figure 4B:
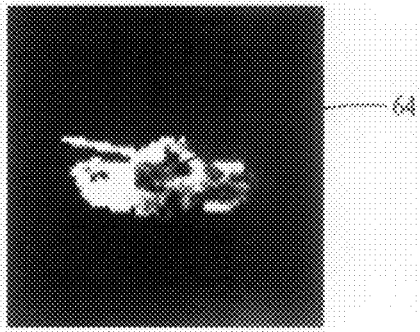

Referring to FIGS. 3 and 4, the minimum acceptable error is generally visualized as images 62 and 64, where each pixel is shown with a value computed by the software in accordance with the expression:

$$\text{ErrorPixel}_{ij} = (\text{SensorRange}_{ij} - \text{SyntheticRange}_{ij})^2$$

The error images 62 and 64 are computed after the search for the x, y and z positions and the roll, pitch and rotations of the 3D wire-frame models 58 and 60 produce a minimum acceptable error. In FIG. 4 the intensity of the error image 62 for vehicle 58 of FIG. 3 is much lower than the intensity of the error image 64 for vehicle 60 of FIG. 3. This shows that vehicle 58 of FIG. 3 is the correct match for the real LADAR image 52 illustrated in FIG. 2.

When a sufficiently low error for one of the d wire-frame models is found then that object is the match and recognition and identification for the object in the real Ladar image 52 is declared.

Figure 5:
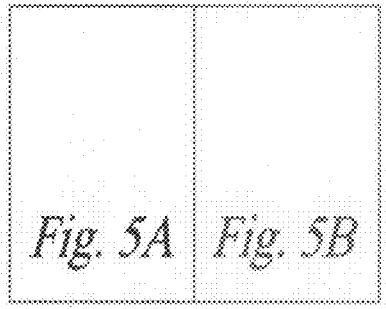
FIG. 5 illustrates a confusion matrix wherein each row of the matrix represents the recognition attempts for a single LADAR sensor target.

Referring to FIG. 5, eight military vehicles were chosen to show how the three dimensional shape correlation program operates. The eight vehicles 70, 72, 74, 76, 78, 80, 82 and 84 were modeled as 3D wire-frame computer models and a sensor computer model was developed to produce synthetic Ladar images 90, 92, 94, 96, 98, 100, 102 and 104. The sensor computer model was also used to simulate the real Ladar images except that range noise was added to the simulated real Ladar images 70, 72, 74, 76, 78, 80, 82 and 84.

Each row of images of FIG. 5 represents the recognition of one target out of a total of eight targets and a different target for each row. The image 70, 72, 74, 76, 78, 80, 82 or 84 is the LADAR sensor image of the target and the eight images 90, 92, 94, 96, 98, 100, 102 or 104 to the right are the synthetic LADAR images of eight target models. The eight target models 90, 92, 94, 96, 98, 100, 102 or 104 are shown in the position that produces the lowest error when compared with the sensor image 70, 72, 74, 76, 78, 80, 82 or 84.

As shown in FIG. 5, the corresponding synthetic image for LADAR sensor image 70 is image 90 of row 1. The corresponding synthetic image for LADAR sensor image 72 is image 92 of row 2. The corresponding synthetic image for LADAR sensor image 74 is image 94 of row 3. The corresponding synthetic image for LADAR sensor image 76 is image 96 of row 4. The corresponding synthetic image for LADAR sensor image 78 is image 98 of row 5. The corresponding synthetic image for LADAR sensor image 80 is image 100 of row 6. The corresponding synthetic image for LADAR sensor image 82 is image 102 of row 7. The corresponding synthetic image for LADAR sensor image 84 is image 104 of row 8.

Table I is in the format of a confusion matrix with each row representing the recognition attempts for a single LADAR sensor target. The targets used for rows one through eight are the same as shown in the first column of FIG. 5. Each search column represents a single target model and the target models used for each column are the same as shown in FIG. 5. A good match will result in a diagonal element being incremented and a bad match will result in an off diagonal element being incremented. The final count shown in each element of the Table I gives the number of times that this program identified the target (as represented by the row of that element) as the type of target as represented by the column of that element.

TABLE I

| 100 image's of | Target 1 | Target 2 | Target 3 | Target 4 | Target 5 | Target 6 | Target 7 | Target 8 |
|---|---|---|---|---|---|---|---|---|
| Target 1 | 99 | 0 | 0 | 1 | 0 | 0 | 0 | 0 |
| Target 2 | 0 | 100 | 0 | 0 | 0 | 0 | 0 | 0 |
| Target 3 | 3 | 0 | 94 | 0 | 3 | 0 | 0 | 0 |
| Target 4 | 0 | 0 | 0 | 100 | 0 | 0 | 0 | 0 |
| Target 5 | 2 | 0 | 0 | 0 | 98 | 0 | 0 | 0 |
| Target 6 | 0 | 0 | 0 | 1 | 0 | 99 | 0 | 0 |
| Target 7 | 3 | 0 | 0 | 1 | 1 | 0 | 95 | 0 |
| Target 8 | 11 | 0 | 0 | 7 | 0 | 8 | 0 | 74 |

Each LADAR sensor image 70, 72, 74, 76, 78, 80, 82 or 84 was identified as one of the targets. The count shown in each element of the Table I provides the number of times that the three dimensional shape correlation program identified the target, represented by the row of that element as the type of target represented by the column of that element. For example, target one of row one was identified 99 times by the correlator program as the type of target represented in column one, Target one of Table I. Further, target two of row two was identified 100 times by the correlator program as the type of target represented in column one, Target two of Table I. Target four of row four was also identified 100 times by the correlation program as the type represented in column one, Target four of Table I.

With respect to Target eight, row eight of Table I indicates that the three dimensional shape correlation program correctly identified Target eight of column one of Table I as Target eight 74 out of 100 times. The 74% correct target identification rate is the lowest rate on Table I. The target recognition rate for the remaining targets, which are Targets one through seven, are well above ninety percent. Target three has a recognition rate of 94% which is the lowest recognition rate for the remaining targets.

Figure 6:
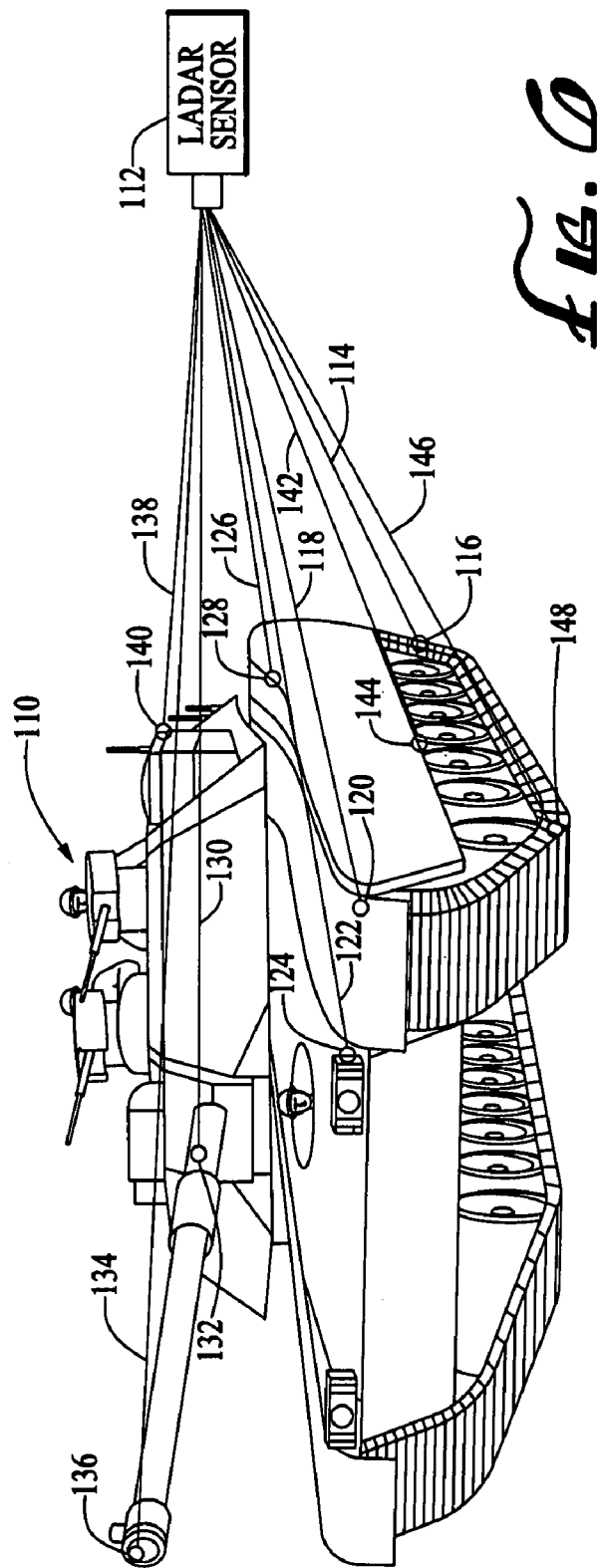
FIG. 6 illustrates a Ladar scan of a target tank which is used to generate the X,Y,Z points for a target which as depicted is a tank.
Figure 7:
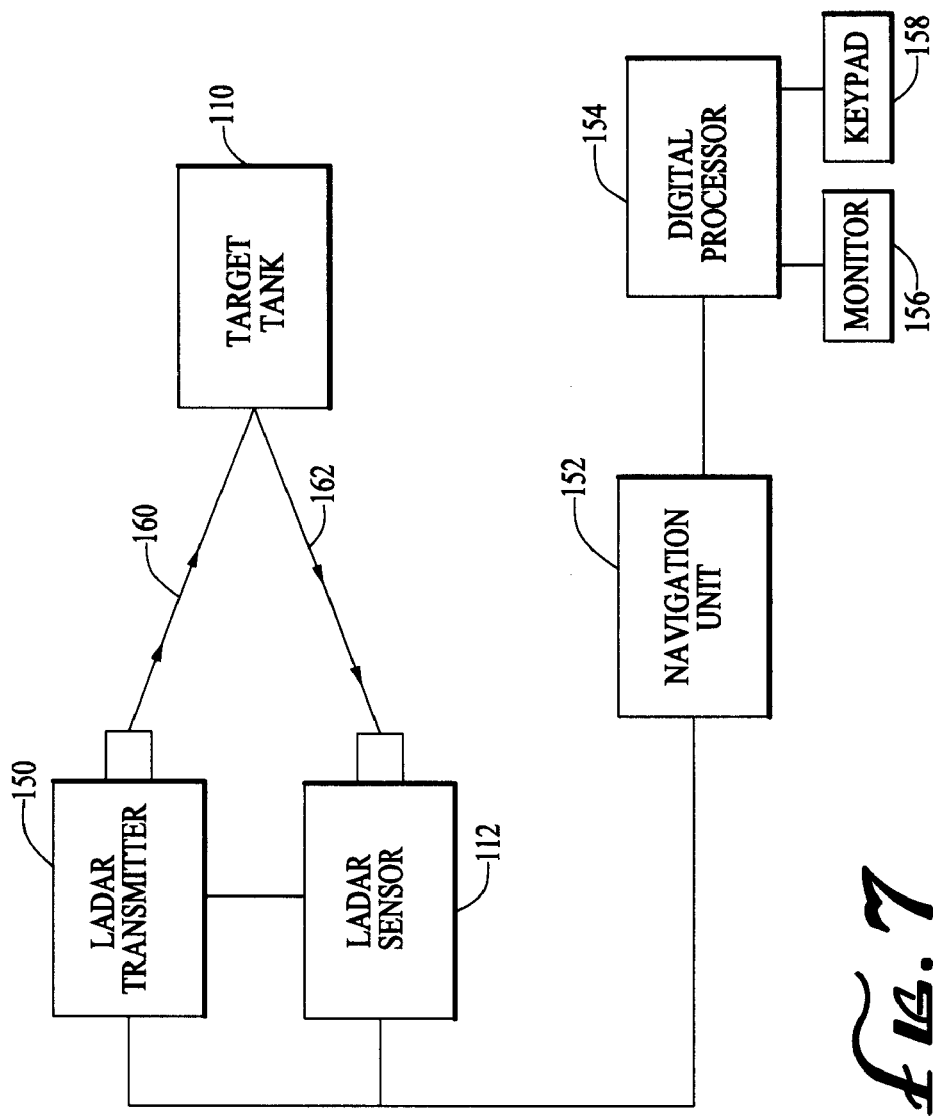
FIG. 7 illustrates a block diagram of the Ladar used to scan the target illustrated in FIG. 6 and generate the X,Y,Z points for the target.

Referring to FIGS. 6 and 7, a LADAR transmitter 150 transmits a Laser beam which is directed along a light path 160 to the surface of a target 110, which is the tank illustrated in FIG. 7. The reflection of the Laser beam from the surface of target 110 is directed along a light path 162 to a LADAR sensor 112. The LADAR transmitter 150 scans the entire surface of the tank 110 with the laser beam and the LADAR sensor 112 senses or detects each X,Y,Z coordinate point generated by the laser beam's reflection from the surface of tank 110.

As shown in FIG. 7, LADAR sensor 112 detects multiple X,Y,Z coordinate points 116, 120, 124, 128, 132, 136, 140, 144 and 148 generated by the laser beam's reflection from the scanned surface of tank 112. X,Y,Z coordinate point 116 identifies a three dimensional point for a portion of the drive system's track at the rear end of the tank 110. X,Y,Z coordinate point 120 identifies a three dimensional point at the front end on the left side of the hull of tank 110. X,Y,Z coordinate point 124 identifies a three dimensional point on the left side of the hull of tank 110 adjacent point 120. X,Y,Z coordinate point 128 identifies a three dimensional point on the hull adjacent the left side to the turret for tank 110. X,Y,Z coordinate point 132 identifies a three dimensional point on the front end of the turret for tank 110. X,Y,Z coordinate point 136 identifies a three dimensional point at the front end of the barrel for tank 110. X,Y,Z coordinate point 140 identifies a three dimensional point on the left side of the turret for tank 110. When combined the X,Y,Z coordinate points form an actual physical three dimensional shape of the object which can be identified as the cloud of points for the object. The cloud of points for tank 110 comprises each point on the surface of tank 110 which has a physical location that can be measured and recorded as a vector location in a three dimensional coordinate system, that is each point is an X,Y,Z point.

Figure 5A:
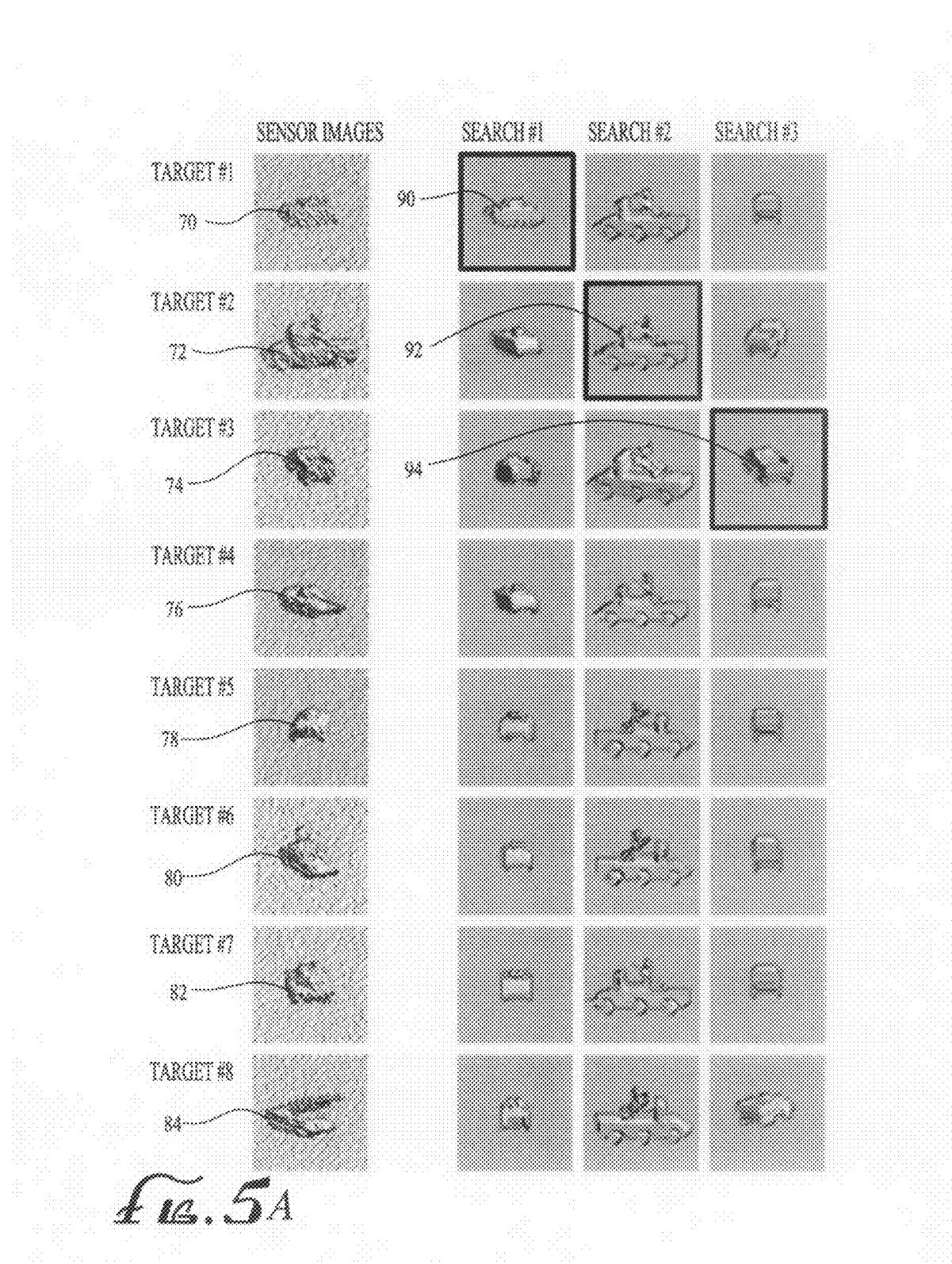

Referring to FIGS. 6, 7 and 8, a triangle computer model representative of target 110 is generated by digital processor 154 and a computer model of the Ladar sensor is used to synthesize the X,Y,Z coordinate points on the computer model of target 110. The eight vehicles 70, 72, 74, 76, 78, 80, 82 and 84 illustrated in FIG. 5A are modeled as three dimensional wire-frame computer models and a Ladar sensor computer model is used to synthesize the X,Y,Z points on each computer generated Ladar image 90, 92, 94, 96, 98, 100, 102 and 104 of FIG. 5B.

An X,Y,Z coordinate location is computed for every point in the Ladar sensor computer modeled images 90, 92, 94, 96, 98, 100, 102 and 104. The computer generated models 90, 92, 94, 96, 98, 100, 102 and 104 are rotated and translated until the X,Y,Z points in one of the computer models 90, 92, 94, 96, 98, 100, 102 or 104 match the X,Y,Z points for the target 110 as measured by the LADAR sensor 112. When the X,Y,Z locations for one of the computer models and target 110 match, then the geometry of the target and computer model will also match which results in an object match and a positive target identification. The target 110 illustrated in FIG. 6 is correctly identified by the three dimensional shape correlation computer software program as an M1A1 Abrams Main Battle Tank.

Referring to FIGS. 6 and 8, FIG. 8 depicts a three dimensional X,Y,Z point cloud plot of target 110 versus the three dimensional wire-frame computer models. The Y axis for the plot of FIG. 8 depicts the sensor measured distance from the actual LADAR sensor position to the each point on the target 110 in meters. The X axis for the plot of FIG. 8 depicts the distance from the computer model of the sensor position to each point on the computer Model of the target in meters.

For purposes of illustration the measured distance 114 from actual X,Y,Z point 116 to sensor 112 is approximately 879.6 meters. The computer measured distance as measured by the computer model of the sensor from the same point on the 3D wire-frame computer model to the computer model of the sensor is also about 879.6 meters. This distance comparison would indicate that model one as synthesized by the computer model of the sensor accurately depicts the target detected by Ladar sensor 110.

The following is a comparison of the measured distance from the Ladar sensor 112 to each point on the target 110 and the computer model of the sensor to each point on the computer model of the target for model one of FIG. 8.

TABLE II

| Distance (point) | Distance from sensor to XYZ point on target | Computer measured distance from sensor model to XYZ point on target model |
|---|---|---|
| Distance 114 (point 116) | 879.6 meters | 879.6 meters |
| Distance 118 (point 120) | 880.6 meters | 880.6 meters |
| Distance 122 (point 124) | 881.1 meters | 881.1 meters |
| Distance 126 (point 128) | 879.8 meters | 879.8 meters |
| Distance 130 (point 132) | 881.3 meters | 881.3 meters |
| Distance 134 (point 136) | 881.6 meters | 881.6 meters |
| Distance 138 (point 140) | 880.3 meters | 880.3 meters |
| Distance 142 (point 144) | 880.4 meters | 880.4 meters |

The distance measurements for from the computer generated Ladar Sensor to the computer generated model 8, which may be another type of tank, a large convoy truck or other military vehicle clearly indicate that the target and computer generated three dimensional model are not a match as shown by the following Table.

TABLE III

| Distance to point | Distance from sensor to XYZ point on target | Computer measured distance from sensor to XYZ point on model |
|---|---|---|
| Distance to point 170 | 879.6 meters | 878.4 meters |
| Distance to point 172 | 880.4 meters | 878.4 meters |
| Distance to point 174 | 881.1 meters | 878.4 meters |
| Distance to point 176 | 881.3 meters | 878.4 meters |
| Distance to point 178 | 879.2 meters | 881.5 meters |
| Distance to point 180 | 879.6 meters | 881.6 meters |
| Distance to point 182 | 879.7 meters | 882.6 meters |
| Distance to point 184 | 884.1 meters | 881.1 meters |

Comparing the distance measurements for the actual target 110 and the computer generated model provides a very clear indication that Model 8 is not the correct identity for the target. Whereas the points 116, 120, 124, 128, 132, 136, 140, 144 and 148 for Model one lie on diagonal line 161, the points 170, 172, 174 and 176 for target 8 lie substantially to the right of diagonal line 161 and the points 178, 180, 182 and 184 lie substantially to the left of diagonal line 161. Thus, it is easy for a user to verify that model eight is not the correct target identification by viewing distance to the X,Y,Z coordinate points for model eight as plotted on the graph of FIG. 8.

A similar analysis can be presented for Models two through seven. As is evident from the plot of FIG. 8 each model two through seven has points to the left of the diagonal line 161 or to the right of the diagonal line 161 or on both sides of the diagonal line 161. While at least one Model (Model four) has some points on diagonal line 161, Model one has all of its points on the diagonal line 161. Accordingly, only Model which correctly identifies the target as an M1A1 tank is Model 1 with each of the X,Y,Z points for the target 112 and the computer model lying on the diagonal line 161.

Referring to FIG. 7, the Ladar pixel data output by sensor 112 is provided to a navigation unit 152. The navigation unit 112 processes this data providing the X,Y,Z coordinates for each point on the surface of target 110 for comparison with the X,Y,Z points from the 3D wire-frame model of the target. The following is representative of the equation used by the navigation unit to generate the X,Y,Z coordinates for the target:

$$\begin{bmatrix} X \\ Y \\ Z \end{bmatrix} = \begin{bmatrix} T11 & T12 & T13 \\ T21 & T22 & T23 \\ T31 & T32 & T33 \end{bmatrix} \times \begin{bmatrix} x \\ y \\ z \end{bmatrix} \times \text{Range} + \begin{bmatrix} PositionX \\ PositionY \\ PositionZ \end{bmatrix} \quad (4)$$

where X,Y,Z are the coordinates for each pixel point on the target's surface as measured by LADAR sensor 112. These coordinates are expressed as an Earth Fixed Locally Level Frame.

The matrix within equation (4), which contains the elements T11, T12, T13, T21, T22, T23, T31, T32 and T33, is a three dimensional rotation matrix. The matrix containing the vector elements x,y,z in equation (4) represents the x,y,z components of the direction vector for each pixel point on the target's surface. Range in equation (4) is measured by the Ladar sensor 112. The matrix containing the elements PositionX, PositionY, PositionZ defines the location for the Ladar sensor 112. Data contained in the rotation matrix, the direction vector matrix, the range measurement, and the sensor position matrix of equation (4) is supplied by the Ladar sensor 112 to the navigation unit 152 in a Ladar Flash Message Format.

The navigation unit 152 processes the messages received from LADAR sensor 112 to generate the X,Y,Z coordinates for each point on target 110.

The X,Y,Z coordinates calculated by navigation unit 152 for target 110 are supplied to digital processor 154. Digital processor 154 rotates and translates the computer generated model of the target until the X,Y,Z coordinate points in the computer model of the target as measured by the computer generated Ladar sensor are the same as the X,Y,Z coordinate points for target 110 as measured by the LADAR sensor 112. The sensor 112 position distance to each X,Y,Z coordinate point on the target 110 is compared with the computer generated sensor position distance to each comparable X,Y,Z point on the computer generated model.

When the X,Y,Z coordinate locations and distances match (as shown in the example of FIG. 8), then the geometry of the target and computer model match which results in an object match and a positive target identification. The results of the target and model comparison by digital processor 154 are provided to a user for viewing on a monitor 156

From Table I, it can readily be seen that the three dimensional shape correlation program does a very good job of classifying objects in Ladar data, although the correlation program does not provide a perfect result. It appears that the search strategy and the error type used with the correlation program will have a large affect on the performance of the correlation program and that improvements will be found by optimizing the search strategy and error type.

At this time it should be noted that other uses of the computer program may be found in security applications where automatic identification of personnel is required. Further, any data which can be simulated and an error computed between the actual data and the simulated data can be used in an application of this computer program.

From the foregoing, it is readily apparent that the present invention comprises a new, unique and exceedingly useful computer program using Ladar data for target identification, which constitutes a considerable improvement over the known prior art. Obviously, many modifications and variations of the present invention are possible in light of the above teachings. It is therefore to be understood that within the scope of the appended claims that the invention may be practiced otherwise than as specifically described.

What is claimed is:

1. A method for recognizing and identifying a target comprising the steps of:
    (a) generating a three dimensional shape of said target by scanning a surface of said target and measuring three dimensional points on the surface of said target, wherein a ladar sensor scans the surface of said target to generate said three dimensional points;
    (b) providing an X,Y,Z coordinate for each of said three dimensional points measured on the surface of said target;
    (c) generating a plurality of three dimensional models of targets to be identified wherein one of said plurality of three dimensional models has a surface which is a match to the surface of said target which is being scanned by said ladar sensor to identify said target;
    (d) providing a modeled X,Y,Z coordinate for each of said three dimensional points on the surface of each of said three dimensional models;
    (e) comparing the X,Y,Z coordinate for each of said three dimensional points on the surface of said target to the modeled X,Y,Z coordinate for each of said three dimensional points on the surface of each of said three dimensional models;
    (f) matching the X,Y,Z coordinate for said three dimensional points on the surface of said target to the modeled X,Y,Z coordinate for said three dimensional points on the surface of one of said three dimensional models wherein a match of said target to one of said three dimensional models allows for an identification of said targets;
    (g) generating an actual distance measurement between said ladar sensor and each of said three dimensional points scanned on the surface of said target;
    (h) generating a synthesized distance measurement between a computer modeled ladar sensor and each of said three dimensional points on the surface of each of said three dimensional models;
    (i) comparing the actual distance measurement for each of said three dimensional points to the synthesized distance measurement for each of said three dimensional points on the surface of each of said three dimensional models to confirm a positive identification for said target;
    (j) generating a graphical plot which has a Y-axis illustrating the actual distance measurement between said ladar sensor and each of said three dimensional points scanned on the surface of said target and an X-axis illustrating the synthesized distance measurement between the computer modeled ladar sensor and each of said three dimensional points on the surface of each of said three dimensional models; and
    (k) generating a diagonal line on said graphical plot which indicates a target match whenever the modeled X,Y,Z coordinate for said three dimensional points on the surface of one of said three dimensional models lie on said diagonal line.

2. The method of claim 1 wherein said method accurately identifies a target type at least ninety five out of one hundred times said ladar sensor detects the target.

3. An apparatus for recognizing and identifying a target comprising:
(a) sensor means for scanning a surface of said target to be identified;
(b) means for generating a three dimensional shape of said target from scanning the surface of said target and measuring three dimensional points on the surface of said target;
(c) means for providing an X,Y,Z coordinate for each of said three dimensional points measured on the surface of said target;
(d) model generating means for generating a plurality of three dimensional models of targets to be identified wherein one of said plurality of three dimensional models has a surface which is a match to the surface of said target which is being scanned by said sensor means to identify said target;
(e) means for providing a modeled X,Y,Z coordinate for each three dimensional point on the surface of each of said three dimensional models;
(f) comparison means for comparing the X,Y,Z coordinate for each of said three dimensional points on the surface of said target to the modeled X,Y,Z coordinate for each of said three dimensional points on the surface of each of said three dimensional models;
(g) target identifying means for matching the X,Y,Z coordinate for said three dimensional points on the surface of said target to the modeled X,Y,Z coordinate for said three dimensional points on the surface of one of said three dimensional models wherein a match of said target to one of said three dimensional models allows for an identification of said target;
(h) means for generating an actual distance measurement between said sensor means and each of said three dimensional points scanned on the surface of said target;
(i) means for generating a synthesized distance measurement between a computer modeled sensor means and each of said three dimensional points on the surface of each of said three dimensional models;
(j) means for comparing the actual distance measurement for each of said three dimensional points to the synthesized distance measurement for each of said three dimensional points on the surface of each of said three dimensional models to confirm a positive identification for said target;
(k) a graphical plot which has a Y-axis illustrating the actual distance measurement between said sensor means and each of said three dimensional points scanned on the surface of said target and an X-axis illustrating the synthesized distance measurement between the computer modeled sensor means and each of said three dimensional points on the surface of each of said three dimensional models; and
(l) a diagonal line generated on said graphical plot which indicates a target match whenever the modeled X,Y,Z coordinate for said three dimensional points on the surface of one of said three dimensional models lie on said diagonal line.

4. The apparatus of claim 3 wherein said apparatus accurately identifies a target type at least ninety five out of one hundred times said sensor means detects the target.

5. The apparatus of claim 3 wherein said sensor means measures said X,Y,Z coordinate for each of said three dimensional points on the surface of said target within a one meter standard deviation range noise to less than 0.5 degrees for roll, pitch and yaw, and a position error to less than 20 centimeters.

6. A three dimensional shape correlator apparatus for recognizing and identifying a target comprising:
(a) a ladar sensor for scanning a surface of said target to be identified, wherein a scan of the surface of said target is obtained from a reflection of a laser beam from the surface of said target which is detected by said ladar sensor, said ladar sensor responsive to said scan of the surface of said target generating ladar data which includes a three dimensional shape of said target and measurements of three dimensional points on the surface of said target, wherein the ladar data generated by said ladar sensor is used by said three dimensional shape correlator apparatus to calculate an actual distance measurement between said ladar sensor and each of said three dimensional points scanned on the surface of said target;
(b) a navigation unit for receiving said ladar data from said ladar sensor, said navigation unit processing said ladar data to provide an X,Y,Z coordinate for each of said three dimensional points measured on the surface of said target by said ladar sensor;
(c) a digital processor for generating a plurality of three dimensional models of targets to be identified wherein one of said plurality of three dimensional models includes a surface which is a match to the surface of said target which is being scanned by said ladar sensor to identify said target;
(d) said digital processor providing a modeled X,Y,Z coordinate for each three dimensional point on the surface of each of said three dimensional models, and said digital processor generating a synthesized distance measurement between a computer modeled sensor means and each of said three dimensional points on the surface of each of said three dimensional models;
(e) said digital processor comparing the X,Y,Z coordinate for each of said three dimensional points on the surface of said target to the modeled X,Y,Z coordinate for each of said three dimensional points on the surface of each of said three dimensional models;
(f) said digital processor matching the X,Y,Z coordinate for said three dimensional points on the surface of said target to the modeled X,Y,Z coordinate for said three dimensional points on the surface of one of said three dimensional models wherein a match of said target to one of said three dimensional models allows for an identification of said target;
(g) a monitor connected to said digital processor for viewing a graphical plot which has a Y-axis illustrating the actual distance measurement between said ladar sensor and each of said three dimensional points scanned on the surface of said target and an X-axis illustrating the synthesized distance measurement between a computer modeled ladar sensor and each of said three dimensional points on the surface of each of said three dimensional models; and
(h) a diagonal line generated on said graphical plot which indicates a target match whenever the modeled X,Y,Z coordinate for said three dimensional points on the surface of one of said three dimensional models lie on said diagonal line.

7. The three dimensional shape correlator apparatus of claim 6 further comprising a ladar transmitter for generating said laser beam which is used to scan the surface of said target and providing a plurality of pixels points on the surface of said target, wherein each pixel point represents one three dimensional point on the surface of said target.

8. The three dimensional shape correlator apparatus of claim 6 wherein said navigation unit computes the X,Y,Z coordinates for each of said three dimensional points on the surface of said target in accordance with the following equation:

$$\begin{bmatrix} X \\ Y \\ Z \end{bmatrix} = \begin{bmatrix} T11 & T12 & T13 \\ T21 & T22 & T23 \\ T31 & T32 & T33 \end{bmatrix} \times \begin{bmatrix} x \\ y \\ z \end{bmatrix} \times \text{Range} + \begin{bmatrix} PositionX \\ PositionY \\ PositionZ \end{bmatrix}$$

wherein X,Y,Z are coordinates for each of said pixel points on the surface of said target as measured by said ladar sensor; the matrix which contains elements T11, T12, T13, T21, T22, T23, T31, T32 and T33, is a three dimensional rotation matrix; the matrix which contains vector elements x,y,z represents the x,y,z components of a direction vector for each of said pixel points on the surface; Range is measured by said ladar sensor; and the matrix containing elements PositionX, PositionY, PositionZ defines a location for said ladar sensor.

9. The three dimensional shape correlator apparatus of claim 6 wherein said digital processor compares the actual distance measurement for each of said three dimensional points to the synthesized distance measurement for each of said three dimensional points on the surface of each of said three dimensional models to confirm a positive identification for said target.

10. The three dimensional shape correlator apparatus of claim 6 wherein said apparatus accurately identifies a target type at least ninety five out of one hundred times said sensor means detects the target.

11. The apparatus of claim 6 wherein said ladar sensor measures said X,Y,Z coordinate for each of said three dimensional points on the surface of said target within a one meter standard deviation range noise to less than 0.5 degrees for roll, pitch and yaw, and a position error to less than 20 centimeters.

* * * * *